US007940913B2

(12) United States Patent
Patel et al.

(10) Patent No.: US 7,940,913 B2
(45) Date of Patent: May 10, 2011

(54) SYSTEM AND METHOD FOR IMPROVED CONTACT CENTER SERVICES TO DISABLED CALLERS

(75) Inventors: Labhesh Patel, Mountain View, CA (US); Fadi R. Jabbour, Sunnyvale, CA (US); Johnny Lee, Mountain View, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1361 days.

(21) Appl. No.: 11/126,700

(22) Filed: May 11, 2005

(65) Prior Publication Data
US 2006/0256950 A1    Nov. 16, 2006

(51) Int. Cl.
*H04M 3/00* (2006.01)
(52) U.S. Cl. ............. 379/265.02; 379/88.02; 379/88.18; 379/121.04; 379/126; 379/142.05; 379/266.01; 379/52
(58) Field of Classification Search ............... 379/88.18, 379/121.04, 142.05, 265.02, 88.02, 52, 126, 379/266.01
See application file for complete search history.

(56) References Cited

U.S. PATENT DOCUMENTS

| 4,472,833 A | 9/1984 | Turrell et al. |
| 5,249,223 A | 9/1993 | Vanacore |
| 5,493,608 A | 2/1996 | O'Sullivan |
| 5,509,064 A * | 4/1996 | Welner et al. ............ 379/265.02 |
| 5,537,470 A | 7/1996 | Lee |
| 5,633,909 A | 5/1997 | Fitch |
| 5,866,890 A | 2/1999 | Neuner |
| 5,937,051 A | 8/1999 | Hurd et al. |
| 6,056,551 A | 5/2000 | Marasco |
| 6,059,184 A | 5/2000 | Ahlstrom et al. |
| 6,137,862 A | 10/2000 | Atkinson et al. |
| 6,160,877 A * | 12/2000 | Tatchell et al. ............... 379/197 |
| 6,259,786 B1 | 7/2001 | Gisby |

(Continued)

FOREIGN PATENT DOCUMENTS
EP    1 030 504 A2    8/2000
(Continued)

OTHER PUBLICATIONS

Nigel Ward and Satoshi Nakagawa, "Automatic User-Adaptive Speaking Rate Selection For Information Delivery", Jun. 25, 2002, (4 pages), University of Tokyo, Tokyo, Japan.

(Continued)

*Primary Examiner* — Curtis Kuntz
*Assistant Examiner* — Yosef K Laekemariam
(74) *Attorney, Agent, or Firm* — The Law Offices of Bradley J. Bereznak

(57) ABSTRACT

A system and method for servicing a caller at a contact center includes prompting the caller for a password associated with a certificate of disability of the caller, then accessing a database that contains the certificate authenticating the password to retrieve information listed in the certificate. The certificate information includes a type of disability of the caller. Following authentication, the system provides a service response appropriate for the type of disability of the caller. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

15 Claims, 1 Drawing Sheet

U.S. PATENT DOCUMENTS

| | | | |
|---|---|---|---|
| 6,333,980 B1 | 12/2001 | Hollatz et al. | |
| 6,546,082 B1* | 4/2003 | Alcendor et al. | 379/52 |
| 6,567,848 B1* | 5/2003 | Kusuda et al. | 709/219 |
| 6,587,545 B1 | 7/2003 | Antonucci et al. | |
| 6,654,458 B1 | 11/2003 | Saleh | |
| 6,675,216 B1 | 1/2004 | Quatrano et al. | |
| 6,687,877 B1 | 2/2004 | Sastry et al. | |
| 6,697,457 B2 | 2/2004 | Petrushin | |
| 6,798,768 B1 | 9/2004 | Gallick et al. | |
| 6,826,194 B1 | 11/2004 | Vered et al. | |
| 6,845,361 B1 | 1/2005 | Dowling | |
| 6,847,715 B1 | 1/2005 | Swartz | |
| 6,859,776 B1 | 2/2005 | Cohen et al. | |
| 6,879,586 B2 | 4/2005 | Miloslavsky et al. | |
| 6,882,641 B1 | 4/2005 | Gallick et al. | |
| 6,940,963 B2 | 9/2005 | Stumer et al. | |
| 7,212,111 B2 | 5/2007 | Tupler et | |
| 7,249,025 B2* | 7/2007 | Junqua et al. | 704/271 |
| 7,295,669 B1 | 11/2007 | Denton et al. | |
| 7,308,246 B2 | 12/2007 | Yamazaki et al. | |
| 7,436,948 B1 | 10/2008 | Thenthiruperai | |
| 2002/0090076 A1 | 7/2002 | Uppaluru et al. | |
| 2002/0196928 A1 | 12/2002 | Johnson et al. | |
| 2003/0002650 A1* | 1/2003 | Gruchala et al. | 379/245 |
| 2004/0059580 A1 | 3/2004 | Michelson et al. | |
| 2004/0109555 A1 | 6/2004 | Williams | |
| 2005/0002516 A1 | 1/2005 | Shtivelman | |
| 2005/0059463 A1 | 3/2005 | Gilmore et al. | |
| 2005/0069102 A1 | 3/2005 | Chang | |
| 2005/0089053 A1 | 4/2005 | Zhu | |
| 2005/0096912 A1* | 5/2005 | Yacoub et al. | 704/275 |
| 2005/0163302 A1* | 7/2005 | Mock et al. | 379/211.02 |
| 2005/0286705 A1 | 12/2005 | Contolini et al. | |
| 2006/0030290 A1 | 2/2006 | Rudolf et al. | |
| 2007/0127691 A1 | 6/2007 | Lert, Jr. | |

FOREIGN PATENT DOCUMENTS

WO    PCT/AU99/00247    4/1999

OTHER PUBLICATIONS

Jing Zheng, Horacio Franco, and Andreas Stolcke, "Rate Of Speech Modeling for Large Vocabulary Conversation Speech Recognition", May 18, 2001, (5 pages).

Speech Technology and Research Laboratory SRI International, http://www.speech.sri.com.

L.Melscoet, Alcatel CCweb: Marriage Of The Internet With The Call Center The Alcatel Ccweb Enables a Company to Combine Its Web Site.

And Call Center Into a Powerful Contact Center, Electrical communication, Alcatel, Brussels, BE, No. 1, 2000, (pp. 43-47).

D.Steul, "Redefining the Call Center: Customer Service On The Internet", Alcatel telecommunications Review, Alcatel, Paris Cedex, FR, Mar. 2000, (6 pages).

* cited by examiner

SYSTEM AND METHOD FOR IMPROVED CONTACT CENTER SERVICES TO DISABLED CALLERS

FIELD OF THE INVENTION

The present invention relates generally to the field of automatic call distributors; more specifically, to systems and methods for providing services to a particular class or category of caller.

BACKGROUND OF THE INVENTION

Interactive voice response (IVR) systems that provide information and channel calls to service agents in response to the spoken words or touch tone signaling of a telephone caller have been deployed for more than a decade. The traditional call center for handling service calls was based on a private branch exchange (PBX) that included core automatic call distributor (ACD) functions for connecting a caller to one of a plurality of agents. During the 1990s, the advent of the Internet, electronic commerce, and computer telephony integration (CTI) transformed the call center in ways that enabled delivery of caller data to agents, thereby enabling agents to become more efficient and to improve customer service levels. Today, many enterprises use multiple call or contact centers (both terms are used synonymously and interchangeably in the present application) that extend across different geographic regions, with communications taking place through public switched telephone networks (PSTNs) and Internet protocol (IP) enabled networks that support multi-channel (voice, e-mail, text chat, and Web collaboration) customer interaction.

By way of example, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. No. 6,871,212. U.S. Pat. No. 6,847,715 discloses a system for operatively integrating an ACD and an IVR unit in which an interaction input from a caller is stored and then transmitted to an appropriate agent workstation. The session initiation protocol (SIP) is a widely accepted standard for Internet conferencing, telephony, presence, events notification and instant messaging, which incorporates the notion of caller preferences for certain types of interactive communication sessions (e.g., designating a certain genre of music when on hold during a call). A method and apparatus for analyzing the performance of an IVR system with respect to routing of calls or contacts received in accordance with a contact flow model is described in U.S. Pat. No. 6,879,685.

One of the problems with existing systems is that callers with physical limitations often have difficulty interacting and communicating with IVRs and ACD agents. For example, persons with attention deficit hyperactivity disorder (ADHD) may have a difficult time waiting for a call center agent to answer their call. Another example is an Alzheimer's patient being physically unable to understand and answer questions or prompts of the IVR due to difficulty in remembering previously conveyed information.

Few solutions exist to the problem of providing IVR and ACD services to disabled persons. A system that can notify a customer of the availability status of agents and which allows the customer to select a particular agent from a group of desired agents by pushing a button according to voice guidance given from the ACD is disclosed in U.S. Pat. No. 6,567,848. This reference also describes the use of collaborative software to provide the selected agent with information about physical handicaps or other difficulties of the caller before the conversation exchange begins. However, a drawback of this approach is that the caller must be physically able to manually input or otherwise convey information about his handicap to the agent beforehand. Obviously, persons with certain types of disabilities may be unable to effectively communicate information about their particular infirmity in the first place. Furthermore, this system suffers from a lack of integrity, since there is no way to prevent misuse by a caller feigning a handicap in order to gain preferential treatment.

Therefore, what is a needed is an improved system that provides IVR and ACD services to disabled callers, and which includes a mechanism for verifying the authenticity of the caller's disability.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
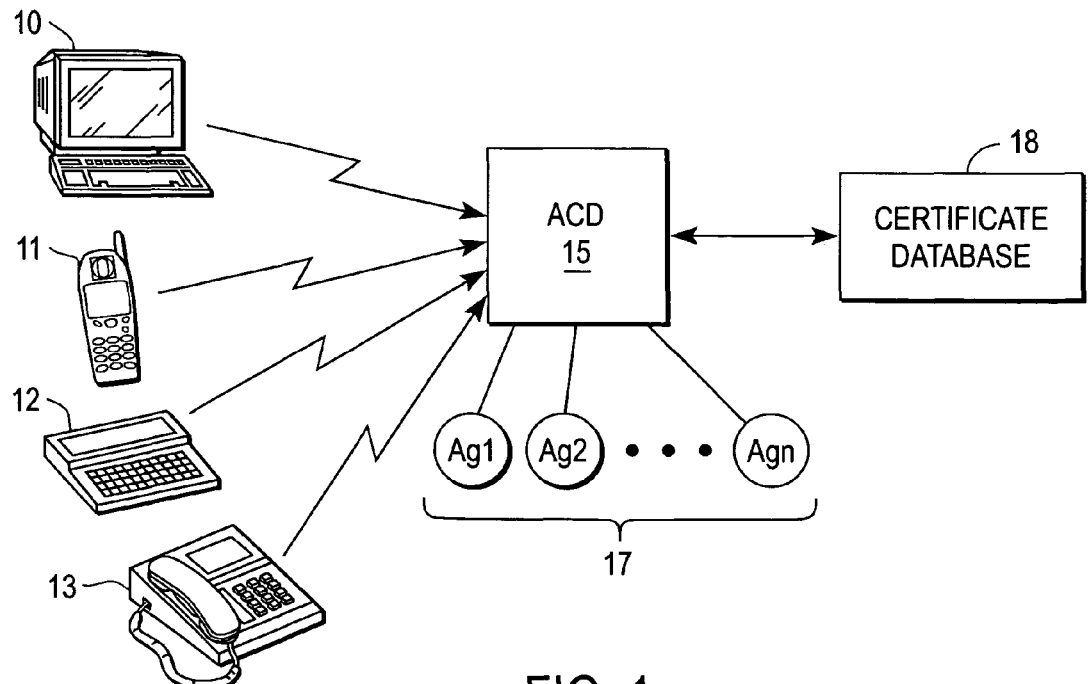
FIG. 1 is a conceptual diagram of a contact center system in accordance with one embodiment of the present invention.

A system and method for providing improved IVR and ACD services to disabled callers is described. In the following description specific details are set forth, such as device types, configurations, data fields, etc., in order to provide a thorough understanding of the present invention. However, persons having ordinary skill in the arts will appreciate that these specific details may not be needed to practice the present invention.

According to one embodiment of the present invention, electronic certificates are used by persons with disabilities or other limitations during a contact center session to receive special service responses, i.e., treatment that permits the caller to properly interact and effectively communicate with IVRs and ACD agents, and which generally makes the caller's experience more pleasant. Certain preferential treatment, such as placing the caller at the front of a call center wait queue, may also be granted based on information contained in the certificate.

For example, a person with attention deficit hyperactivity disorder (ADHD) may be transferred to the next available agent immediately, thereby reducing their wait time. Additionally, the call center may route such callers to especially patient agents, or agents having experience dealing with persons with such disabilities. For a person with Alzheimer's disease, the call center may invoke a special IVR script that periodically repeats choices made by the caller. Another possibility is to record the caller's explanation of his reason for calling and then play back the recording to the caller whenever a long delay in caller response time is detected. Callers with Alzheimer's disease may also be granted preferential treatment by placing them at the front of the ACD wait queue.

For a blind caller, an IVR script that does not require visualization by the caller (such as directing the caller to a website for information) may be invoked. For instance, the IVR may provide website information by speaking to a blind caller, or provide an alternative uniform resource locator (URL) that is user-friendly to persons with impaired sight. Similarly, for callers who are mute or have speech impediments, an appropriate service response may include invoking an IVR script that does not offer the option of using speech recognition tools to retrieve information.

The electronic certificates may be generated by a hospital, doctor, or other health care provider capable and/or authorized to verify a person's disability. The certificate may then be provided directly to the caller (e.g., downloaded) or transmitted to a central database or repository. For example, a disabled person may be given an electronic certificate in the form of encrypted information stored in person's cell phone, PC, hand-held personal digital assistant (PDA), computer-readable memory, or communication device capable of transmitting the certificate to an ACD. Alternatively, the health care provider may transmit the certificate directly to a database center that maintains and stores the certificates. The information contained in the certificate may include the owner's name, user ID, particular disability (or disabilities), contact information (e.g., phone number), password, expiration date, etc.

FIG. 1 shows a high-level diagram of a system in accordance with one embodiment of the present invention. The system includes an ACD 15 configured to receive and service calls from a variety of different caller devices 10-13. ACD 15 may include a number of hardware, firmware, or software modules that implement a variety of IVR scripts, each of which is written and adapted for use during sessions with callers having specific disability types. ACD 15 is also shown with connections to a plurality of service agents 17 ($Ag_1$-$Ag_N$). When a person with a disability calls into a call or contact center the caller's disability is identified, either automatically by transmission of the caller's disability certificate (as described below) or through an IVR or ACD prompt. For example, an initial menu prompt may ask the caller to make a certain keypad, touch-tone, or voice response if they have a disability and would like to receive special treatment.

In the situation where the caller's disability certificate is not transmitted by the caller, ACD 15 responds to the caller's request for special disability treatment by opening a communication channel to a certificate database 18. Certificate database 18 may be local to the contact center or a centralized database authority external to the contact center. After a communication channel has been established, ACD 15 accesses database 18 to obtain the pertinent disability information (and/or other information) associated with the caller. In one embodiment, the caller provides a password that is used by ACD 15 to access database 18, retrieve the caller's certificate information, and verify or authenticate the caller's disability (or disabilities). Once the caller's identity and associated disability has been authenticated, ACD 15 provides a service response that is appropriate for the caller's specific disability. This service response may include invoking a special IVR script, providing preferential treatment, and/or transferring the call to a particular one of agents 17 with experience handling the caller's particular disability.

The exemplary caller devices shown in FIG. 1 include a PC 10 that communicates via data packets transmitted over the Internet, a cell phone 11 providing mobile, wireless communications, a two-way teletype (TTY) or telecommunications device for the deaf (TDD) 12, and a conventional handset telephone. The latter two devices may connect with ACD 15 through a standard PSTN. Other devices and other forms of transmitting voice and/or data may also be utilized to initiate a call session with a contact center.

Each of devices 10-13 includes a user interface (e.g., keypad, voice, touch-screen, etc.) that enables the caller to input data to ACD 15. The data may include responses to IVR prompts, password information, a speech pattern or signature of the caller, voice commands (i.e., spoken words), and keypad or touch-tone inputs.

In one embodiment, the caller may download his certificate from database 18, or directly from a health care provider, into a communication device, e.g., one or more of devices 10-13. For example, a caller's certificate may be loaded into a memory location of cell phone 11. When the disabled person calls into a contact center using cell phone 11, his certificate may be automatically transferred to ACD 15. Alternatively, the certificate may be tied to the person's cell phone number. In this latter embodiment, the system automatically recognizes the automatic number identification (ANI) of the incoming call, and therefore automatically recognizes the certificate associated with the telephone number of the incoming call. The certificate may be automatically transmitted as part of the incoming call, or, alternatively, ACD 15 may respond to the caller's ANI by accessing database 18 to retrieve the certificate associated with the ANI of the incoming call.

Instead of being sent or looked-up automatically, the certificate may be transmitted by the caller to the system after the caller provides a password or passcode. This latter implementation adds another layer of security that prevents misuse by anyone using cell phone 11.

In yet another embodiment, the certificate is represented by a code that the caller enters after his call has been answered by the contact center.

In still another alternative embodiment, a speech recognition signature of the caller may be associated with his certificate. In this embodiment, ACD 15 is configured with a speech recognition software module or is configured to retrieve a caller's certificate from database 18 based on the caller's speech signature.

Another possibility is to utilize known fingerprint recognition tools as a way of authenticating the caller's identity/certificate. For example, PC 10 may be configured with a fingerprint recognition device that digitizes a caller's fingerprint image, which digitized image may subsequently be authenticated by comparison against stored images associated with disability certificates in database 18.

Figure 2:
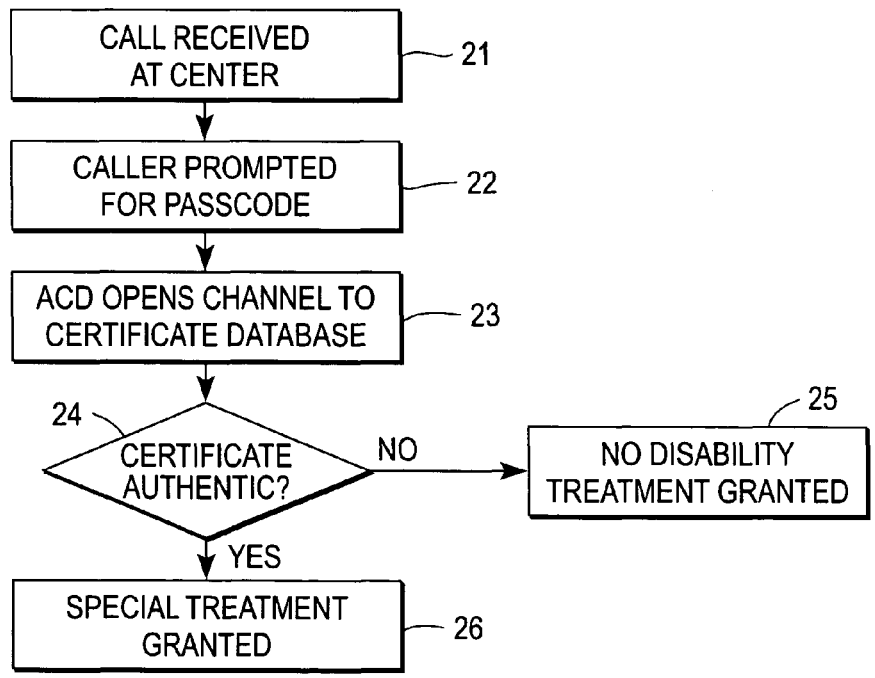
FIG. 2 is a flowchart diagram that illustrates a method of operation according to one embodiment of the present invention.

FIG. 2 is a flowchart diagram that illustrates a basic method of servicing a caller at a contact center according to one embodiment of the present invention. When a call is received at the center (block 21), the system is notified that the caller has a disability that requires a specific service response. This notification may occur automatically (e.g., through an ANI service that provides the telephone number of the incoming call) or manually (e.g., caller initiated request from a prompt menu). Once the system recognizes that the caller is requesting or is in need of special treatment, it responds by prompting the caller to input a password or authenticating code (block 22). As discussed previously, the password or passcode may take different forms. Authentication of the caller's identity and disability may involve ACD 15 opening a communication channel with certificate database 18 (block 23) followed by verification of the caller's password or passcode in database 18 (block 24). As before, a successfully authenticated caller is granted special treatment (block 26), which may involve invoking a special IVR script appropriate for the particular disability of the caller, or by transferring the caller to a particular agent with experience or training in handling persons with the particular disability, or some combination of both, e.g., special IVR script followed by ACD transfer to a particular agent.

In the event that authentication fails, no special disability treatment is granted (block 25). In this situation the caller may be again prompted to re-enter his password or passcode information. (It should be understood that in the foregoing discussion, the terms "password" and "passcode" are both intended to broadly refer to any information that may be utilized or relied upon by the system to verify or authenticate the disability certificate credentials. As discussed previously, this information may take different forms and may be transmitted in a variety of ways via different mediums.)

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMS, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting process (e.g., from a caller device) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-automated method of servicing an incoming call from a caller at a call center, the caller having a type of disability that inhibits a normal mode of communication, the type of disability excluding hearing-impaired disabilities, the method comprising:
    prompting, by an interactive voice response (IVR) script or an automatic call distributor (ACD) of the call center, the caller for a password associated with an electronic certificate that authenticates the type of disability of the caller;
    accessing a database that contains the electronic certificate;
    authenticating the password;
    retrieving information listed in the electronic certificate, which includes the type of disability of the caller;
    providing a non-subscription-based service response that facilitates communication between the caller and the call center in a manner consistent with the type of disability of the caller.

2. The method of claim 1 wherein the non-subscription-based service response includes providing certain IVR script specifically tailored for the type of disability of the caller.

3. The method of claim 1 wherein the non-subscription-based service response comprises transferring the caller to an agent experienced in handling calls from persons having the type of disability of the caller.

4. The method of claim 1 wherein the non-subscription-based service response includes providing preferential treatment to the caller.

5. A computer-automated method of servicing an incoming call from a caller to a call center, the caller having a type of disability that inhibits a normal mode of communication, the type of disability excluding hearing-impaired and speech-impaired disabilities, the method comprising:
    providing, by an interactive voice response (IVR) script or an automatic call distributor (ACD) of the call center, the caller with a menu that includes an option for requesting a non-subscription-based service response that facilitates communication between the caller and the call center in a manner consistent with the type of disability of the caller;
    certifying the type of disability of the caller in response to selection of the option by the caller;
    providing the non-subscription-based service response to the caller.

6. The method of claim 5 wherein the non-subscription-based service response comprises invoking a special IVR script appropriate to the type of disability of the caller.

7. The method of claim 5 wherein the non-subscription-based service response comprises placing the caller at a front position in an ACD wait queue.

8. The method of claim 5 wherein the non-subscription-based service response comprises transferring the caller to an agent experienced in handling calls from persons with the type of disability of the caller.

9. The method of claim 5 wherein certifying the type of disability of the caller comprises automatically receiving from a communication device of the caller an electronic certificate that authenticates the type of disability.

10. The method of claim 5 wherein certifying the type of disability of the caller comprises accessing a database containing an electronic certificate that authenticates the type of disability of the caller.

11. A system for servicing an incoming call from a caller to a call center, the caller having a type of disability that inhibits a normal mode of communication, the type of disability excluding hearing-impaired and speech-impaired disabilities, the system comprising:
    an automatic call distributor (ACD) to receive the incoming call and to provide the caller with an menu option for requesting a non-subscription-based service response that facilitates communication between the caller and the call center in a manner consistent with the type of disability of the caller; and
    a database that stores an electronic certificate authenticating the type of disability of the caller,
    wherein the ACD is operable to access the database in response to selection Of the menu option by the caller and to retrieve the certificate, the ACD being further operable to provide the non-subscription-based service response to the caller.

12. The system of claim 11 wherein the non-subscription-based service response of the ACD includes transfer of the caller to an agent having experience with the type of disability of the caller.

13. The system of claim 11 wherein the ACD includes an interactive voice response (IVR) system that provides the menu option.

14. A system for servicing an incoming call from a communication device of a caller to a call center, the caller having a type of disability that inhibits a normal mode of communication, the type of disability excluding hearing-impaired and speech-impaired disabilities, the system comprising:
    an automatic call distributor (ACD) to receive the incoming call, the ACD being operable to automatically receive an electronic certificate from the communication device, the certificate authenticating the type of disability of the caller; and an interactive voice response (IVR) system associated with the ACD, the IVR having a special script that facilitates communication between the caller and the call center in a manner consistent with the type of disability of the caller, the special script being invoked automatically following receipt of the certificate by the ACD.

15. The system of claim 14 wherein the certificate is automatically transmitted to the ACD from the communication device when the incoming call is received by the ACD.

* * * * *